United States Patent
Doke et al.

(10) Patent No.: US 10,620,977 B2
(45) Date of Patent: Apr. 14, 2020

(54) METHOD AND SYSTEM FOR PROVIDING SECURITY FEATURES IN A SMART PHONE

(71) Applicant: Tata Consultancy Services Limited, Mumbai (IN)

(72) Inventors: Pankaj Doke, Thane (IN); Sanjay Kimbahune, Thane (IN); Manash Paul, Noida (IN); Sylvan Lobo, Thane (IN); Karan Bhavsar, Thane (IN); Sujit Shinde, Thane (IN); Mithun B S, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/426,389

(22) Filed: May 30, 2019

(65) Prior Publication Data

US 2019/0370037 A1 Dec. 5, 2019

(30) Foreign Application Priority Data

May 31, 2018 (IN) .............................. 201821020435

(51) Int. Cl.
*G06F 9/04* (2006.01)
*H04W 4/90* (2018.01)
(Continued)

(52) U.S. Cl.
CPC .............. *G06F 9/453* (2018.02); *G08B 7/06* (2013.01); *G08B 21/02* (2013.01); *G08B 23/00* (2013.01);
(Continued)

(58) Field of Classification Search
CPC .......... G06F 9/453; H04W 4/90; G08B 21/02; G08B 23/00; G08B 27/006; H04M 1/725; H04M 1/72536
See application file for complete search history.

(56) References Cited

U.S. PATENT DOCUMENTS 10,438,477 B1 * 10/2019 Siembab .............. G08B 25/016
2013/0325630 A1 * 12/2013 Mendenhall ....... G06Q 30/0269
705/14.66

(Continued)

OTHER PUBLICATIONS

Medhi, I. et al. (Apr. 2011). "Designing Mobile Interfaces for Novice and Low-Literacy Users," *ACM Transactions on Computer-Human Interaction (TOCHI)*, vol. 18, No. 1; pp. 2:1 to 2:28.

(Continued)

*Primary Examiner* — Khawar Iqbal
(74) *Attorney, Agent, or Firm* — Finnegan, Henderson, Farabow, Garrett & Dunner LLP (57) ABSTRACT

The present disclosure addresses the technical problems faced by a basic user or an emergent user while using a smart phone. For the basic users it is difficult to identify the threat on the smartphone. A system and method for enhancing the security features of a smartphone has been provided. Initially, the system classify the user of the smartphone as the basic user or non-basic user using a series of questions. The proposed method is only applicable to the basic user archetype. The present disclosure further describes the method for simplification of an information architecture and multimodal communication of the threats on the smartphone for a basic user archetype or emergent users. Specifically, this disclosure bridges the information communication gaps between the basic archetype user and the information system by surfacing the risks and optimizing their information hierarchy.

11 Claims, 7 Drawing Sheets

(51) Int. Cl.
*G06F 9/451* (2018.01)
*G08B 23/00* (2006.01)
*G08B 7/06* (2006.01)
*G08B 27/00* (2006.01)
*H04M 1/725* (2006.01)
*G08B 21/02* (2006.01)

(52) U.S. Cl.
CPC ...... *G08B 27/006* (2013.01); *H04M 1/72536* (2013.01); *H04W 4/90* (2018.02)

(56) References Cited

U.S. PATENT DOCUMENTS

| | | | |
|---|---|---|---|
| 2016/0349841 A1* | 12/2016 | Beaty | G06F 3/015 |
| 2017/0065874 A1* | 3/2017 | Moore | H04R 1/1041 |
| 2017/0186334 A1* | 6/2017 | Sasidhar | A63F 13/537 |
| 2018/0077546 A1* | 3/2018 | Arunachalam | G01C 21/206 |
| 2018/0207522 A1* | 7/2018 | Roman | A63F 13/23 |
| 2018/0213286 A1* | 7/2018 | Roman | H04N 21/2187 |
| 2019/0066460 A1* | 2/2019 | Ullrich | G06F 3/016 |
| 2019/0098126 A1* | 3/2019 | Shuttleworth | G06F 3/017 |
| 2019/0114445 A1* | 4/2019 | Zhang | G06F 21/6245 |
| 2019/0130719 A1* | 5/2019 | D'amico | G06Q 50/26 |
| 2019/0327363 A1* | 10/2019 | Raleigh | H04W 4/08 |

OTHER PUBLICATIONS

Chang, A. et al. (Apr. 2005). "Audio-Haptic Feedback in Mobile Phones," *Proceeding CHI EA '05 CHI '05 Extended Abstracts on Human Factors in Computing Systems*, Portland, Oregon; pp. 1264-1267.

\* cited by examiner

METHOD AND SYSTEM FOR PROVIDING SECURITY FEATURES IN A SMART PHONE

PRIORITY CLAIM

This U.S. patent application claims priority under 35 U.S.C. § 119 to: India Application No. 201821020435, filed on May 31, 2018. The entire contents of the aforementioned application are incorporated herein by reference.

TECHNICAL FIELD

The embodiments herein generally relates to the field of enhancing security features in a smartphone, and, more particularly, to a method and system for enhancing usability of security features for emergent type or basic user archetype smartphone users.

BACKGROUND

India has a very large number of less literate smartphone users as per the Census data and TRAI records. Less-Literate in this context are users with education level not more than standard 6 in local language. Such archetype users are called as "Basic Users" in the Emergent Users classification. In addition to less literate users, there are few users who are literate enough but not have enough cognitive ability to operate the smart phone. Such as elderly users, normally above the age of 60 they are not comfortable enough in using the smart phones.

These basic users have specific challenges when it comes to cognitive tasks, such as, inability to do transfer of learning, inability to navigate deeper hierarchies of information architecture, inability of understand classification and information architecture. Typically, the basic users would use the phone to "receive a call" and "make a call" even though the smartphone is a computing device and uses the paradigm of computing for communicating with the user as compared to a telecom device. Thus the smartphone is closer to a desktop phone than a rotary or keypad based desk phone without any (or constrained) display.

The current state of art display of information architecture in Android based smartphones for control measures and their administration is complex and confusing. There are definite need of some kind of threat detection mechanism which can alarm the smartphone user in case of any adverse condition. Existing threat detection/reporting mechanism communicates threat in a language which is not easily understandable by the basic smartphone users. Words like "quarantine" may be beyond this user's understanding, and this adds to his inability to react to the reported threat.

The user is hence unable to do a threat modelling, risk assessment, risk mitigation and respond to the various security risks of a smartphone. This exposes the basic user to a variety of risks (unsafe practices of sharing via non-certified mechanisms like ShareIT, or content via Bluetooth) which the user is unable to comprehend, assess and respond. So, the challenge exists at the tri junction of information architecture which is complex, in a foreign language, for a specific domain of security, the cognitive abilities of an emergent user's archetype (Basic User) and Usability of interface.

Hence there exists a need to change the information architecture mechanism based on the modelling of the basic user archetype and have a just in time computer of the threat model and information communication to the user.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for enhancing usability of security on a smartphone. The system comprises an input module, a memory and a processor. The input module provides a series of questions to a user on a screen of the smartphone. The processor further comprises a capturing module, a user classification module, an information architecture modification module, a threat modelling module and a multimodal design module. The capturing module captures a set of answers provided by the user corresponding to the series of questions. The user classification module classifies the user based on the captured set of answers, wherein the user is classified in one of a basic user archetype or a non-basic user archetype and the basic and non-basic users having respective cognitive abilities. The information architecture modification module modifies an information hierarchy of security controls of the smartphone in alignment to the basic user archetype. The threat modelling module identifies a set of applications running on the smartphone, identifies a set of sensors on the smartphone corresponding to the identified set of applications, and generates a threat model using the identified set of sensors and corresponding threats on them in the context of the basic user archetype. The multimodal design module translates the threat model to one or more of an audio or visual haptic in alignment with the cognitive abilities of the basic user archetype.

In another aspect the embodiment here provides a method for enhancing usability of security features for a smartphone. Initially, a series of questions are provided to a user on a screen of the smartphone. In the next step, a set of answers provided by the user corresponding to the series of questions are captured. Further, the user is classified based on the captured set of answers, wherein the user is classified in one of a basic user archetype or a non-basic user archetype and the basic and non-basic users having respective cognitive abilities. In the next step, an information hierarchy of security controls of the smartphone is modified in alignment to the basic user archetype. Further, a set of application running on the smartphone identified. A set of sensors on the smartphone corresponding to the identified set of applications are also identified. In the next step, a threat model is generated using the identified set of sensors and corresponding threats on them in the context of the basic user archetype. And finally, the threat model is translated to one or more of an audio or visual haptic in alignment with the cognitive abilities of the basic user archetype.

In yet another embodiment, a computer program product comprising a non-transitory computer readable medium having a computer readable program embodied therein, wherein the computer readable program, when executed on a computing device, causes the computing device to provide a series of questions to a user on a screen of the smartphone (302); capture a set of answers provided by the user corresponding to the series of questions (304); classify the user based on the captured set of answers, wherein the user is classified in one of a basic user archetype or a non-basic user archetype and the basic and non-basic users having respective cognitive abilities (306); modify an information hierarchy of security controls of the smartphone in alignment to the basic user archetype (308); identify a set of application running on the smartphone (310); identify a set of sensors on the smartphone corresponding to the identified set of applications (312); generate a threat model using the identified set of sensors and corresponding threats on them in the context of the basic user archetype (314); and translate the threat model to one or more of an audio or visual haptic in alignment with the cognitive abilities of the basic user archetype (316).

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Glossary—Terms Used in the Embodiments

The expression "basic user archetype" or "emergent users" in the context of the present disclosure refers to a set of smartphone users who have very basic knowledge of technology and finds the use of smartphone as a challenging task. Emergent users are typically constrained by a range of factors that set apart their usage of technology when compared to mainstream, 'traditional' mobile device users. Key amongst these characteristics is limited access to resources. This constraint often means that emergent users have low mobile data allowances and little bandwidth.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

Figure 1:
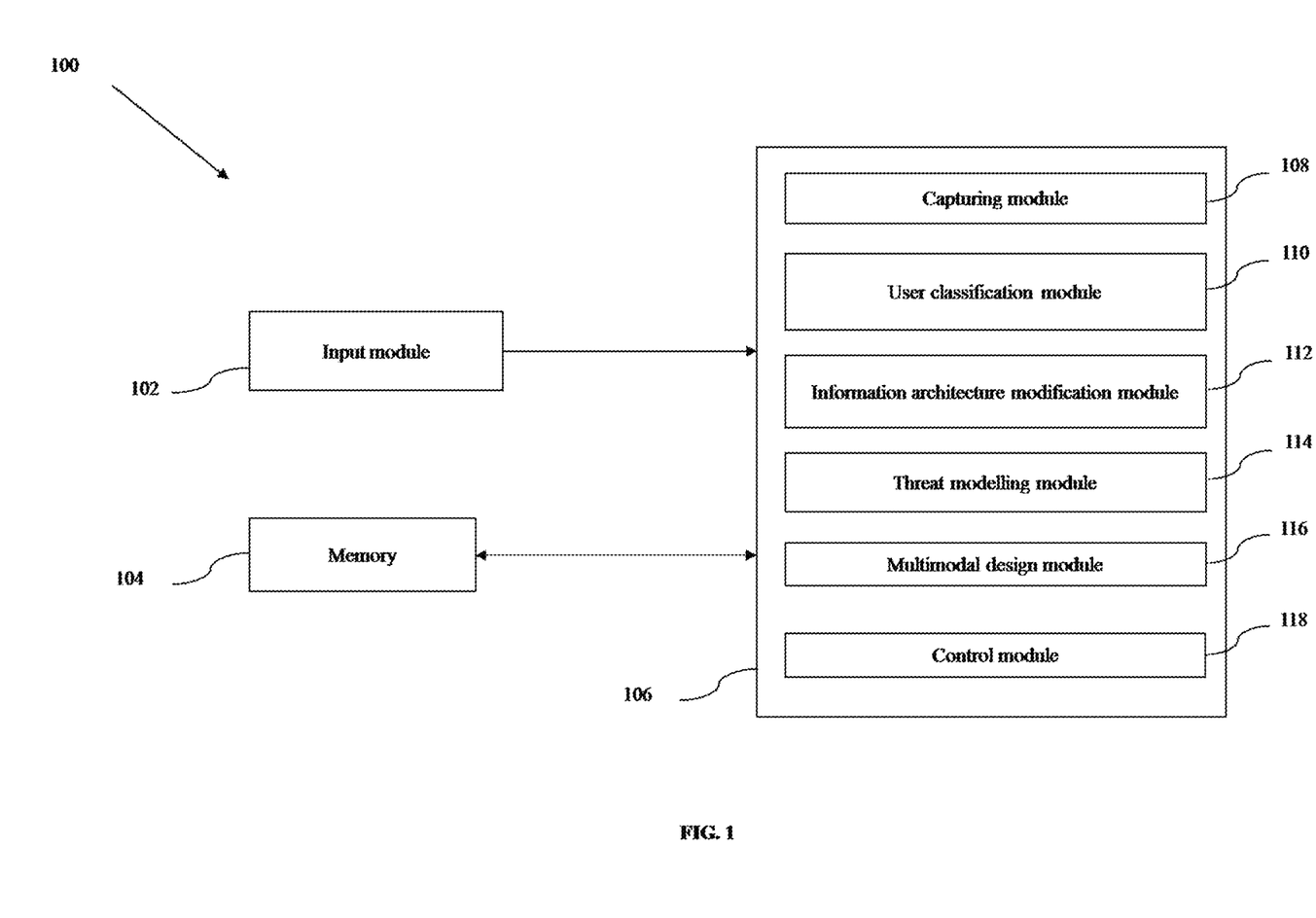
FIG. 1 illustrates a block diagram of a system for enhancing usability of security on a smartphone according to an embodiment of the present disclosure.

According to an embodiment of the disclosure, a system 100 for enhancing usability of security features on a smartphone is shown in the block diagram of FIG. 1. The system 100 is in itself implemented on the smartphone. The present disclosure describes the method for simplification of an information architecture and multimodal communication of the threats on the smartphone for a basic user archetype or emergent users. Specifically, this disclosure bridges the information communication gaps between the basic archetype user and the information system by surfacing the risks and optimizing their information hierarchy.

According to an embodiment of the disclosure, the system 100 further comprises an input module 102, a memory 104 and a processor 106 as shown in the block diagram of FIG. 1. The processor 106 works in communication with the memory 104. The processor 106 further comprises a plurality of modules. The plurality of modules accesses the set of algorithms stored in the memory 104 to perform a specific task. The processor 106 further comprises a capturing module 108, a user classification module 110, an information architecture modification module 112, a threat modelling module 114 and a multimodal design module 116.

According to an embodiment of the disclosure the input module 102 is configured to provide an input to the processor 106. The input module 102 is configured to provide a series of questions to a user on a screen of the smartphone. The series of questions are configured to identify the psychographic and demographic status of the user. When the user first time starts using the smartphone, the system 100 is not aware that whether the user is the basic archetype user or the non-basic archetype user. In an example the input module 102 can be display screen of the smartphone which can be used to display the output. The input module 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the system 100 comprises the capturing module 108 and user classification module 110. The capturing module 108 is configured to capture a set of answers provided by the user corresponding to the series of questions. The user classification module 110 classifies the user based on the captured set of answers. The user is classified in one of a basic user archetype or a non-basic user archetype. Both the basic users and non-basic users having their respective cognitive abilities.

Figure 2:
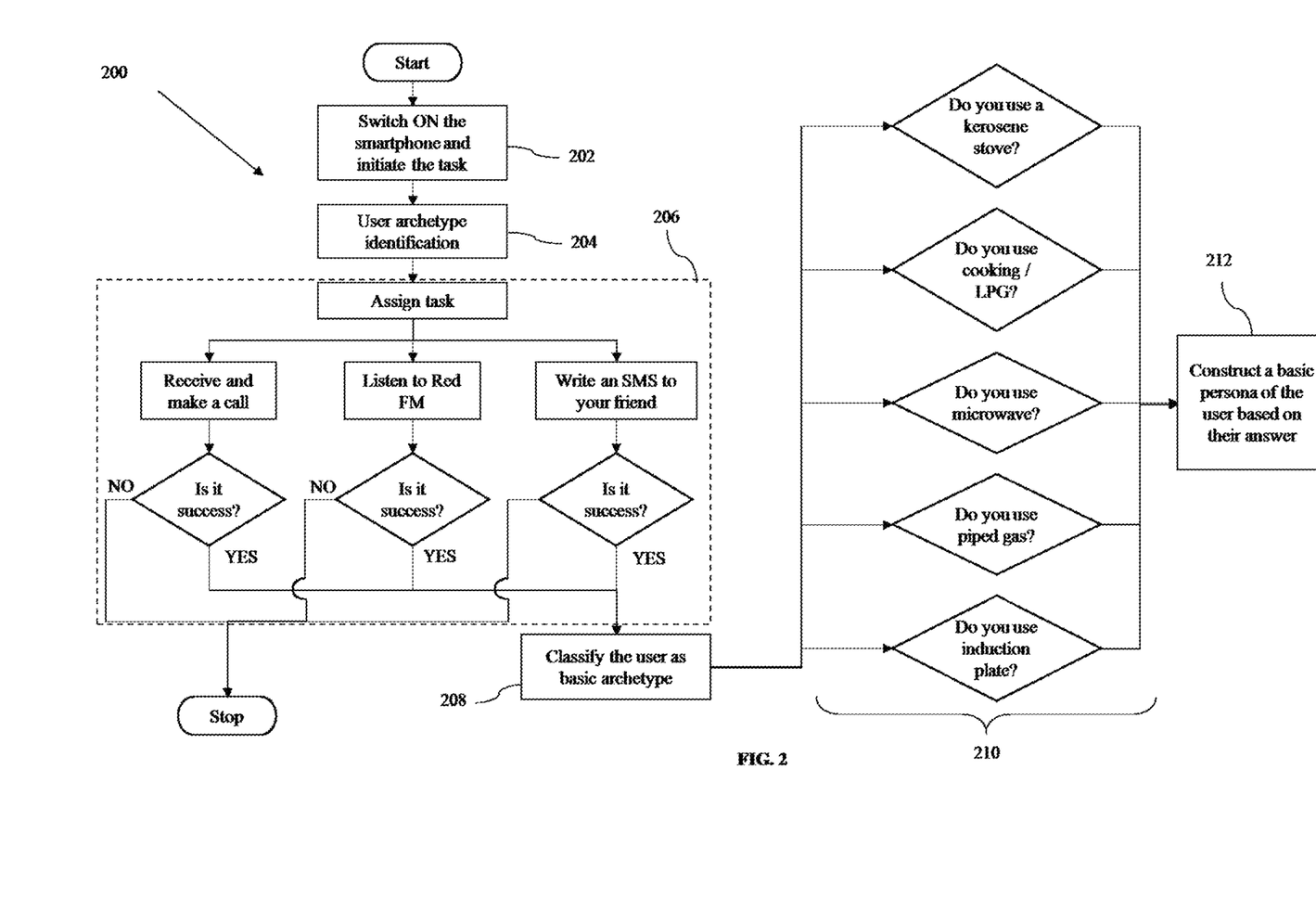
FIG. 2 is a flowchart illustrating the steps involved in classifying the user of the smartphone according to an embodiment of the present disclosure.

A schematic flowchart 200 of the process of classification of the user is shown in the flow diagram of FIG. 2. Initially, at step 202, the user switches ON his smartphone. At the start of the smartphone at step 204, the user archetype identification process starts. At step 206, the user will be asked to perform certain tasks. The tasks are a series of usability goals to the user. The user is then tested to successful completion of these tasks and satisfaction. In the present example of the FIG. 2, the goals assigned to the user are: [1] Receive and make a voice call, [2] Listen to a particular FM channel, and [3] Forward a selected message to a WhatsApp contact. It should be appreciated that any other similar tasks can also be assigned instead of above mentioned three tasks.

At step 208, based on the successful and satisfactory completion of the assigned task, the user is classified as the basic user. Subsequent to this at step 210 and 212, the user is presented an instrument of socio-economic classification. This is then used to add to the persona creation template of the basic archetype user. The present disclosure is limited in scope to the context and capabilities of the basic archetype user. The disclosure also limited to the capabilities of the basic archetype user.

According to an embodiment of the disclosure, the system 100 further comprises the information architecture modification module 112. The information architecture modification module 112 modifies an information hierarchy of security controls of the smartphone in alignment to the basic user archetype. The information architecture is a tree, which requires the user to perform a certain number of steps to navigate to a desired node, making it difficult for the basic archetype user. For example for a tree of height N and depth M, the sensors and information nodes are typically at the best case, at a level of (0) and at the worst case, at the level of (2). These however, exceed the 7+−2 criteria of Miller's working memory test.

According to an example, these steps will map/convert a tree of breadth B and depth D to a tree of breadth B (not more than 3) and a depth, not more than 3. Since this could lead to pruning of elements, the design component with human assistance maps it to a {3, 3} level. In those cases, where the breadth is exceeding the value of 3, the information is surfaced by the algorithm to a depth of zero and breadth of perimeter of display unit. Thus, the tree is then 'linearised' to a (that is pre-order, in-order, post-order) rendering the tree in to a linear structure (list). Thus, If the tree is rebalanced and if it fails, then a linear list is applied. This is indicated as follows: a) Create the tree from the phone, b) Balance the tree and c) Linearize and then threshold—killing the non-important (less accessed points—least defined by apps requesting it). This unit changes the information hierarchy of the security controls in alignment to the user archetype.

According to an embodiment of the disclosure, the system 100 also comprises the threat modelling module 114. The threat modelling module 114 is configured to generate a threat model. Initially, the threat modelling module 114 identifies a set of applications running on the smartphone. Further the threat modelling module 114 identifies a set of sensors on the smartphone corresponding to the identified set of applications. And finally, the threat model is generated using the identified set of sensors and corresponding threats on them in the context of the basic user archetype.

The function of the threat modelling module 114 can be explained using metaphor elicitation, the user is presented a set of cards indicating physical analogy of damage or threat to the asset—that is, the physical phonebook with user—this is then mapped to the contacts on the phone—to visually indicate the mapping. The prior scenario based understanding of threats to the asset is now extended to the intangible information asset—that is the phone book. The phone book is an asset and the physical-phonebook threats are now plausibly mapped to the damage to the 'virtual'/digital phonebook. The use of metaphor helps map the user's mental model from a physical threat to a digital/virtual threat (indicated by a visual/animated mechanism), thus helping build a threat model.

This then helps the user build the threat model and assessment in the context (such as while using a public Wi-Fi or hotspots while using apps like ShareIt/Xender). This analogy based mapping is then used to model and respond to the threat. The number of pages in the physical notebook is mapped to the number of contact display pages on the phone. This gives a base level of assessment. The call log frequency is then weighted with this entry to arrive at a weighted score of the asset. This score is then normalized by the number of entries present in the phonebook.

According to an embodiment of the disclosure, the system 100 also comprises the multimodal design module 116. The multimodal design module 116 is configured to translate the threat model to one or more of an audio or visual haptic in alignment with the cognitive abilities of the basic user archetype. In another embodiment, the multimodal design module 116 is also configured to translate into 'Text' if displayed in local language and audio is supplemented with PIM2R. The multimodal design module 116 may further be configured to recommend corrective actions to the user to mitigate the threat. This way the system 100 is making the smartphone more secure to a basic user archetype in case of any unforeseen threat by providing an alarm in alignment with the cognitive abilities of the user.

This shows the relationship between the sensors and information bases/sources and their consumers. However, the visual presentation and architecture makes it difficult for the user to comprehend. The multimodal design module 116 presents a curation system to the designers of the system 100 for selection the most appropriate semiotics for the user model. The system 100 consists of a display of plurality of icons, sketches, and semiotics. These are then presented to a set of sample archetypical users. This presentation is via a computer based interface operated by a human designer. The human designer would capture the association of the semiotics by the user archetype and record them as text labels. These text labels are then used to query an ontological network to capture a higher level of abstraction of the association as well as a lower level representation. Thus, for a given icon a set of association is arrived at. This set/network of association is then curated by a team of designers. The process of curation involves a display of the candidate icon on the displays of the designers in the form of a shared web workspace or a projected space on their smartphone. This association graph/network is then assigned weights by the designers.

At the voting stage of decision, the node with the highest and the lowest weights are chosen. The lowest weight icon is chosen for the proof-of-concept prototype and the designer uses the highest weight as a design input for creation. The designer, then using the candidate icon and the highest abstraction creates an artifact icon. This icon is then again shown to the set of archetypical user to assess the association. This process is repeated with the aid of the computer system to have a convergence between the designed artifact and the user's mental association. The process is considered meeting closure when it reaches a specified threshold value of association.

According to an embodiment of the disclosure, the system 100 may also include a control module 118. The control module 118 has pre-computed mapping of all access control list and applications on the smartphone. Given this mapping/matrix [N*M], at any instance, it filters this matrix, based on the currently running apps/daemons. This filtered matrix is then monitored for sensor and information base access by the context user of the app by the user. For example, for a Basic user, there is no need of a communication app like WhatsApp to be running and accessing the SMS inbox on a public unsecured Wi-Fi (at railway station). Thus, such an access to the SMS inbox is triggered as a risk. This hence relies on the principles of "mediated controls" implemented by the virtual device driver. Mediated controls provides the necessary mechanism to offer protection against unauthorized acts by authorized application.

Figure 3A:
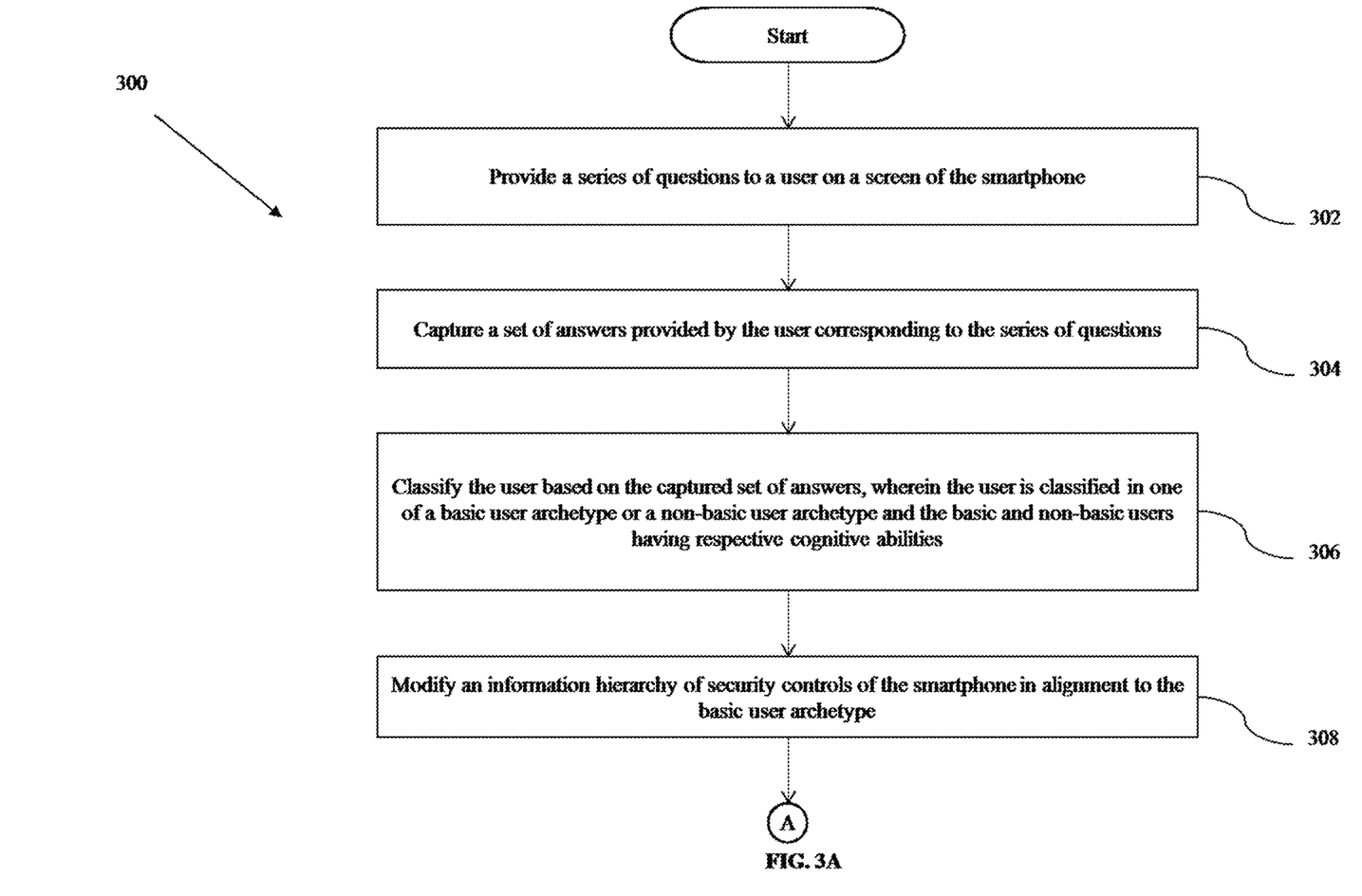
FIGS. 3A and 3B is a flowchart illustrating the steps involved in enhancing usability of security on a smartphone according to an embodiment of the disclosure.
Figure 3B:
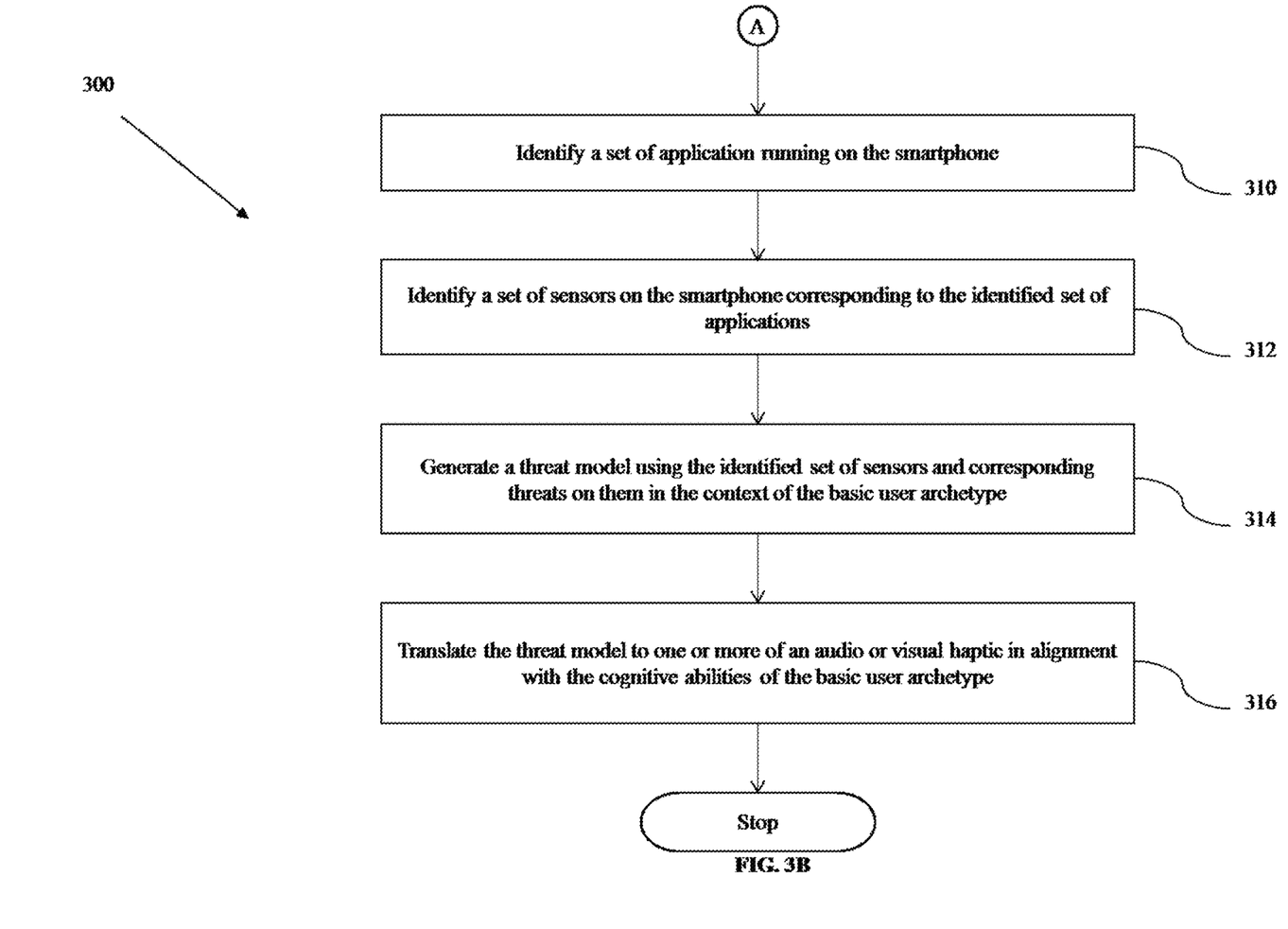

In operation, a flowchart 300 illustrating the steps of enhancing usability of security features for the smartphone is shown in FIG. 3A-3B. Initially at step 302, the series of questions are provided to the user on the screen of the smartphone. The series of questions are provided while switching ON the smartphone. In the next step 304, the set of answers provided by the user corresponding to the series of questions are captured. At step 306, the user is classified based on the captured set of answers. The user is classified in one of a basic user archetype or a non-basic user archetype and the basic and non-basic users having respective cognitive abilities. A few more questions are provided to add to the persona creation template of the basic archetype user. The present disclosure is limited in scope to the context and capabilities of the basic archetype user.

In the next step 308, an information hierarchy of security controls of the smartphone in alignment to the basic user archetype. The information hierarchy is modifies in such a way that it is more user compatible to a basic user archetype. In the next step 310, the set of application are identified which running on the smartphone. Correspondingly at step 312, the set of sensors on the smartphone are also identified corresponding to the identified set of applications. In the next step 314, a threat model is generated using the identified set of sensors and corresponding threats on them in the context of the basic user archetype. Step 310 to 314 are performed by the threat modelling module 114. And finally at step 316, the threat model is translated to one or more of an audio or visual haptic in alignment with the cognitive abilities of the basic user archetype. More than one visual haptic can also be provided corresponding to each of the threat on the smartphone. Moreover, a factor may be assigned for each of the threats based on insecure environment as judged by sensor activity on the smartphone. In addition to that the corrective actions may also be recommended to the user to mitigate the threat. This way the system 100 is making the smartphone more secure to a basic user archetype in case of any unforeseen threat.

Figure 4:
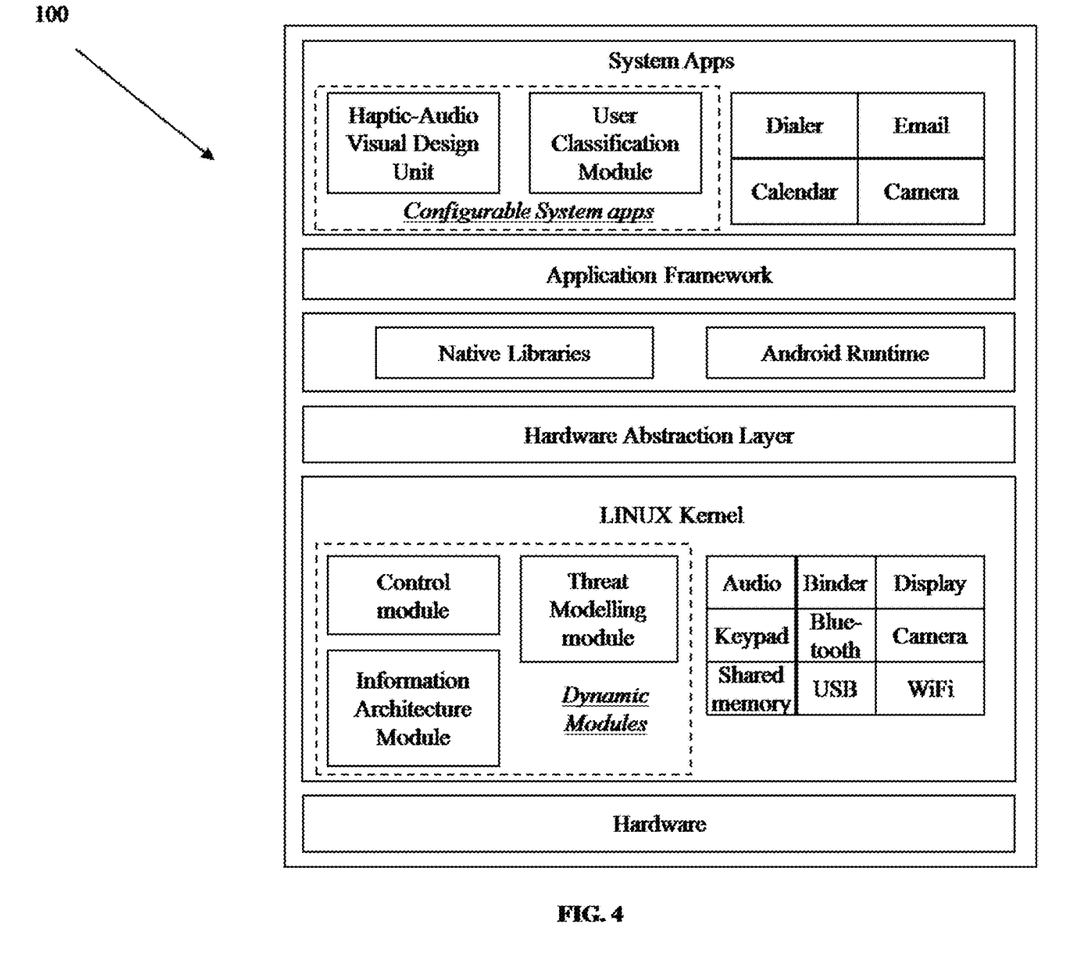
FIG. 4 shows a block diagram of the system considering Android architecture according to an embodiment of the disclosure.

According to an embodiment of the disclosure, the working of system 100 considering Android architecture as an example is shown in the block diagram of FIG. 4. The system comprises of few modules in LINUX kernel and others in user space.

Kernel Space Units: In the Kernel Space Units, the Control module 118, the threat modelling module 114 and the information architecture modification module 112 are present and will be implemented as dynamic modules. Algorithm and models for respective modules can be recalibrated/updated dynamically. Having modules at kernel level will provide modules to have intercepted access to the currently executing program on the system.

Main unit (Control module): It acts as a controller which controls and coordinates with different components of the system 100. This will control the units in kernel space and will also communicate and control the units in the user space.

Threat modelling module: This module intercepts the currently executing program on the system 100 and the sensors they have access to. It further correlates this to the threat vectors and identifies the threats to the context of the user.

Information architecture module: This module changes the information hierarchy of the security controls in alignment to the user archetype. Because it has higher privileges than user space application it cannot be overridden or preempted by any rogue application.

User Space Modules: The multimodal design module 116 and the user classification module 110 will be implemented in user space. These modules will receive command and control actions from the main control module 118. The appearance/execution can be configured dynamically.

Multi modal design module: It is a unique visual design of curated semiotics which is used to translate the threat model to audio/visual/haptic in alignment with the cognitive abilities of the basic user archetype. The text is displayed in local language and the audio interface could be via PIM2R protocol.

User classifier module: It automates the classification of the user into various archetypes—one being the basic user archetype.

Whenever mobile is started, kernel space modules will be loaded in the system. These units will intercept the currently executing program (foreground/background: apps/services) on the system. Control unit algorithm, will have pre-computed mapping of all ACL and applications on the phone. Given this mapping/matrix [N*M], at any instance, it filters this matrix, based on the currently running application/services. This filtered matrix is then monitored for sensor and information base access by the context user of the app by the user.

Combination of this matrix, algorithm, threat model and user persona will determine the threat at runtime. Whenever a threat is found, control unit informs the user through the multi modal design module 116 in user space via respective indicators or audio messages. The multi modal design module will recommend corrective actions to the user based upon maximum color variation based on threat density. Further to the multi modal representation of the semiotic, the user can then access the semiotic to update/change/modify the controls to align the security with the expectations.

According to an embodiment of the present disclosure, the working of system 100 can also be explained with the help of an example as follows. Consider a user "A" who is using a smartphone as a "basic user archetype". When the smartphone starts, it offers the user a series of questions. These are a set of tasks of increasing complexity and assess if the user can complete them successfully. The topmost of these is transfer money to someone Ebay's account and bottommost is of make-a-call and receive-a-call. After this the system would classify the user—say, in this case, the basic user archetype. The system 100 then queries and retrieves the information architecture of the underlying smartphone system, say Android, for security controls. It then constructs a tree of this information architecture.

The system 100 then targets to rebalance this tree with a depth, which is in congruence with the classification and hence cognitive ability of the user. The system 100 then identifies a list of programs running on the system. It then acquires a list of sensors/devices in use by these programs. Further, it intercepts the access of these devices by the programs. Having intercepted the access, it assesses the context of use of the program by the user with the privileges acquired. For example, privilege to create an account without permission of the user by Facebook. Subsequent to this, the system monitors such an execution of such an act. If such an act does not, it then use the re-architected information to select the appropriate semiotic representation to indicate to the user of such an act. Further to the multimodal representation of the semiotic, the user can then access the semiotic to update/change/modify the controls to align the security with the expectations. This is guided with a wizard in tune with the cognitive abilities of the basic user.

Figure 5:
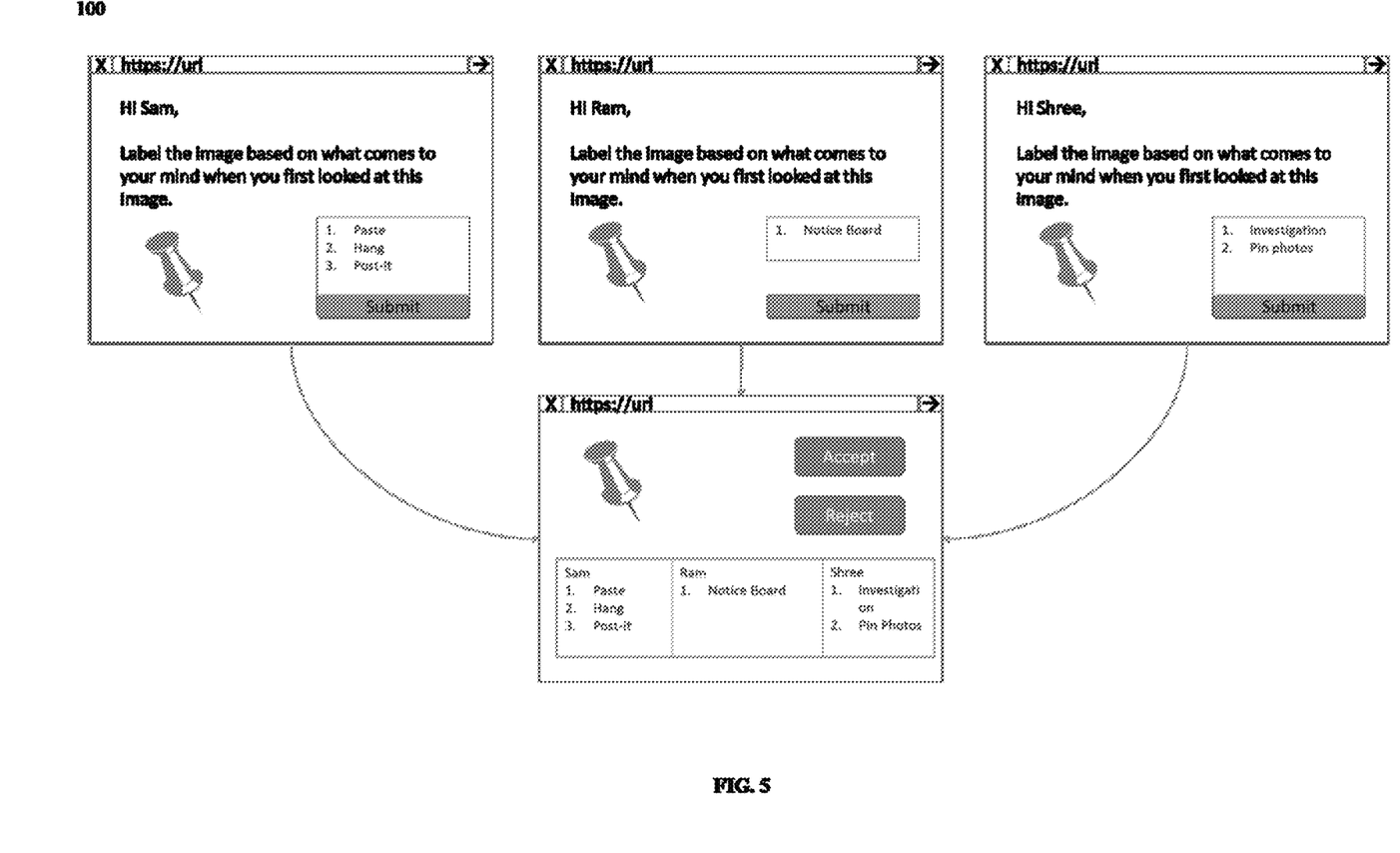
FIG. 5 shows an example of the multimodal design module where designer rejects the seed idea according to an embodiment of the disclosure.
Figure 6:
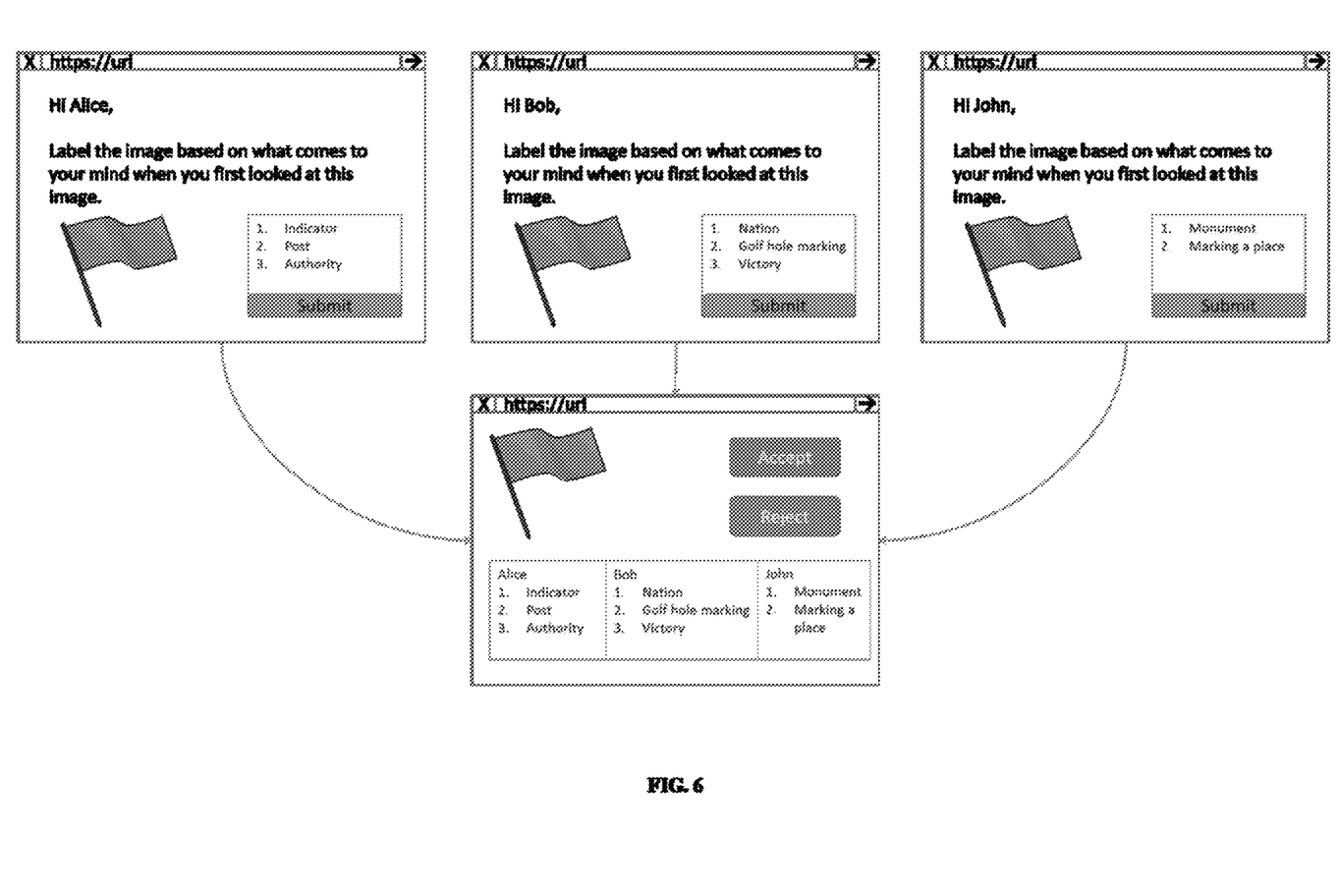
FIG. 6 shows an example of the multimodal design module where designer accepts the seed idea according to an embodiment of the disclosure.

According to an embodiment of the disclosure, FIG. 5 and FIG. 6 shows an example of the working of the multimodal design module 116. In this example, the seed idea is to come up with an icon to be used, to mark places on a map. Basic less-literate archetype users are shown different images and asked to label them with things they could relate the images with. In FIG. 5 a "pin" image is shown and in FIG. 6 a "flag" image is shown. The images which gets labels closest to the seed idea gets chosen. In the present example image of the "Flag" shown in FIG. 6 gets the closest labels to the seed idea, therefore designer accepts while the image of FIG. 5 is rejected by the designer. There could be more iterations, but for example sake, only two iterations are represented.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the problem of challenges faced by a basic user or an emergent user. The disclosure provides a method and system for enhancing security features for the smart phone for the basic user archetype.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for enhancing usability of security features for a smartphone, the method being processor implemented and comprising:

providing a series of questions to a user on a screen of the smartphone;

capturing a set of answers provided by the user corresponding to the series of questions;

classifying the user based on the captured set of answers, wherein the user is classified in one of a basic user archetype or a non-basic user archetype and the basic and non-basic users having respective cognitive abilities;

modifying an information hierarchy of security controls of the smartphone in alignment to the basic user archetype by converting an information architecture tree of breadth B and depth D to a modified tree of breadth B1 not more than 3 and a depth D1 not more than 3;

identifying a set of application running on the smartphone;

identifying a set of sensors on the smartphone corresponding to the identified set of applications;

generating a threat model using the identified set of sensors and corresponding threats on them in the context of the basic user archetype; and translating the threat model to one or more of an audio or visual haptic in alignment with the cognitive abilities of the basic user archetype.

2. The method of claim 1 further comprising recommending corrective actions to the user to mitigate the threat.

3. The method of claim 1, wherein the visual haptic is provided corresponding to each of the threat on the smartphone.

4. The method of claim 1 further comprising highlighting a one or more icon objects selection from a set of presented images based on the classified user and the threat model.

5. The method of claim 1 further comprising assigning a factor for each of the threats based on insecure environment as judged by a sensor activity on the smartphone.

6. The method of claim 1, wherein the series of questions are provided when the user starts the smartphone for the first time.

7. The method of claim 1, wherein the series of questions are configured to identify the psychographic and demographic status of the user.

8. The method of claim 1 further comprising displaying the threat on the screen of the smartphone in a local language of the basic user archetype.

9. The system of claim 1, wherein the processor is further configured to control and coordinate with a plurality of components of the system.

10. A system for enhancing usability of security on a smartphone, the system comprising:
an input device for providing a series of questions to a user on a screen of the smartphone;
a memory; and
a processor in communication with the memory, the processor configured to execute instructions stored in the memory for;

capturing a set of answers provided by the user corresponding to the series of questions;
classifying the user based on the captured set of answers, wherein the user is classified in one of a basic user archetype or a non-basic user archetype and the basic and non-basic users having respective cognitive abilities;
modifying an information hierarchy of security controls of the smartphone in alignment to the basic user archetype by converting an information architecture tree of breadth B and depth D to a modified tree of breadth B1 not more than 3 and a depth D1 not more than 3;
identifying a set of applications running on the smartphone,
identifying a set of sensors on the smartphone corresponding to the identified set of applications, and
generating a threat model using the identified set of sensors and corresponding threats on them in the context of the basic user archetype; and
translating the threat model to one or more of an audio or visual haptic in alignment with the cognitive abilities of the basic user archetype.

11. A computer program product comprising a non-transitory computer readable medium having a computer readable program embodied therein, wherein the computer readable program, when executed on a computing device, causes the computing device to:
provide a series of questions to a user on a screen of a smartphone;
capture a set of answers provided by the user corresponding to the series of questions;
classify the user based on the captured set of answers, wherein the user is classified in one of a basic user archetype or a non-basic user archetype and the basic and non-basic users having respective cognitive abilities;
modify an information hierarchy of security controls of the smartphone in alignment to the basic user archetype by converting an information architecture tree of breadth B and depth D to a modified tree of breadth B1 not more than 3 and a depth D1 not more than 3;
identify a set of application running on the smartphone;
identify a set of sensors on the smartphone corresponding to the identified set of applications;
generate a threat model using the identified set of sensors and corresponding threats on them in the context of the basic user archetype; and
translate the threat model to one or more of an audio or visual haptic in alignment with the cognitive abilities of the basic user archetype.

* * * * *